UNITED STATES PATENT OFFICE.

BIRGER FJELD HALVORSEN, OF CHRISTIANIA, NORWAY, ASSIGNOR TO NORSK HYDRO-ELEKTRISK KVAELSTOFAKTIESELSKAB, OF CHRISTIANIA, NORWAY.

AMMONIUM NITRATE FERTILIZER.

1,406,455.  Specification of Letters Patent.  Patented Feb. 14, 1922.

No Drawing. Application filed July 8, 1919. Serial No. 309,501.

*To all whom it may concern:*

Be it known that I, BIRGER FJELD HALVORSEN, a subject of the King of Norway, residing at Oscars Gate 71, Christiania, Norway, have invented certain new and useful Improvements in Ammonium Nitrate Fertilizers; and I do hereby declare the following to be a full, clear, and exact description of the invention, such as will enable others skilled in the art to which it appertains to make and use the same.

This invention has for its object an improved ammonium nitrate fertilizer.

As known the ammonium nitrate would be a very valuable fertilizer, if it were not for its property of hardening into lumps during storage. It has been suggested to counteract this tendency of agglomerating into lumps by means of mixing the ammonium nitrate with various substances such as a suspension of morass ore, (bog iron ore), kieselguhr and the like, and subjecting the mixture to a mechanical treatment.

Such a method is described in the Norwegian patent specification Nr. 28373.

By this method of preparation the product is loaded with small quantities of indifferent substances which it is true do no harm but which involve expenses for their purchase and in the form of increased freight costs for the finished product.

The present invention is now based upon this observation that an improvement in the physical properties of the ammonium nitrate is effected by the agency of phosphates and in accordance with this observation the present invention consists in subjecting a mixture comprising ammonium nitrate and a phosphate to agglomeration. By this method the product is not charged with the costs of indifferent admixtures, a mixed fertilizer being obtained. In this mixture the added phosphate acts as a phosphate fertilizer, in that the ammonium nitrate behaves as a so-called physiologically acid fertilizer. The fact is that ammonia has been found to be oxidized in the mould more rapidly to nitric acid than it is taken up by the plants. Thus when ammonium nitrate has been employed as a fertilizer free acid will be produced. It has also been discovered (by the Russian scientist Prianischnikow) that natural phosphates have a much better action when employed in combination with physiologically acid or neutral fertilizers, than when they are used together with physiologically basic fertilizers.

In the manufacture of the described fertilizer the proportions of phosphate added to the nitrate of ammonia may be varied within wide limits. Usually, however, good results will be obtained by using from 2 to 10 parts by weight to each 1 part by weight of phosphate.

The best results are attained by using as addition to this nitrate the more easily decomposable phosphates such as for instance the Gafsa phosphate but also other phosphates can be used with advantage. "Gafsa phosphate" is a type of mineral phosphates which are of a comparatively readily decomposable character. Such phosphates occur, for example, at Gafsa in North Africa and are considered to be of organic origin. (See Ludwig Schucht Die Fabrication des Superphosphates 1909 pages 47–49 and 78).

Example:

100 kilograms of Gafsa phosphates were ground to a fine powder, and the powdered product was then mixed with 200 kilograms of nitrate of ammonia.

The mixture is moistened with water and subjected to granulation. This granulation may be effected by continuously stirring the mixture while heating the same to a temperature sufficient to effect the drying of the mass.

I claim:

1. A fertilizer consisting of a granulated mixture of ammonium nitrate and phosphate material.

2. A fertilizer consisting of a granulated mixture of ammonium nitrate and phosphate rock.

3. A fertilizer consisting of a granulated mixture of ammonium nitrate and a readily decomposable phosphate mineral of an organic origin.

4. A process of manufacturing fertilizer, which consists in mixing a phosphate and ammonium nitrate with water and granulating the mixture during evaporation of the moisture.

In testimony that I claim the foregoing as my invention, I have signed my name in presence of two subscribing witnesses.

BIRGER FJELD HALVORSEN.

Witnesses:
 GUNNAR TOMTU,
 MARIE BERGQUIST.